United States Patent
Joshi (10) Patent No.: US 10,519,386 B2
(45) Date of Patent: Dec. 31, 2019

(54) PROCESSING ALKALI METAL-SULFIDE OR ALKALI EARTH METAL-SULFIDE TO OBTAIN THE ALKALI METAL OR ALKALI EARTH METAL

(71) Applicant: Technology Holding, LLC, Salt Lake City, UT (US)

(72) Inventor: Ashok V Joshi, Salt Lake City, UT (US)

(73) Assignee: Technology Holding LLC, Salt Lake City, UT (US)

( * ) Notice: Subject to any disclaimer, the term of this patent is extended or adjusted under 35 U.S.C. 154(b) by 0 days.

(21) Appl. No.: 15/527,110

(22) PCT Filed: May 24, 2016

(86) PCT No.: PCT/US2016/033919
§ 371 (c)(1),
(2) Date: May 16, 2017

(87) PCT Pub. No.: WO2016/191421
PCT Pub. Date: Dec. 1, 2016

(65) Prior Publication Data
US 2018/0066196 A1    Mar. 8, 2018

Related U.S. Application Data (60) Provisional application No. 62/198,910, filed on Jul. 30, 2015, provisional application No. 62/174,106, (Continued)

(51) Int. Cl.
*C10G 32/02* (2006.01)
*C10G 29/04* (2006.01)
(Continued)

(52) U.S. Cl.
CPC .............. *C10G 32/02* (2013.01); *C10G 21/06* (2013.01); *C10G 21/08* (2013.01); *C10G 21/28* (2013.01);
(Continued)

(58) Field of Classification Search
CPC ................ C25C 3/04; C25C 3/02; C25C 5/02
See application file for complete search history.

(56) References Cited

U.S. PATENT DOCUMENTS 1,902,385 A * 3/1933 Hiroshi ..................... C01F 5/32
423/178
2,002,747 A    5/1935 Morrell
(Continued)

OTHER PUBLICATIONS

(Zhao-Karger, Z et al.) Performance improvement of magnesium sulfer batteries with modified non-nucleophilic electrolytes. Advanced Energy materials. 2014; abstract; p. 140115, right column, second paragraph.
(Continued)

*Primary Examiner* — Salil Jain
(74) *Attorney, Agent, or Firm* — Brian C. Trask (57) ABSTRACT

Applying a sufficient quantity of an Alkali metal or an Alkaline earth metal to a fluid in a stripping process loop 106 to form a first intermediary compound and thereby, to strip the undesired element from the process fluid 102. The first intermediary compound 130 is processed in a recovery process loop 110 to recover the Alkali metal or Alkaline earth metal. The recovered Alkali metal or Alkaline earth metal is then re-introduced to an additional quantity of process fluid to strip and clean the undesired element from the additional quantity of the process fluid. A recovery process loop 110 may include either or both of a chemical substitution process, and an electrolytic process, effective to separate the Alkali metal or Alkaline earth metal from the undesired element or another compound.

8 Claims, 6 Drawing Sheets

Related U.S. Application Data filed on Jun. 11, 2015, provisional application No. 62/166,086, filed on May 25, 2015.

(51) Int. Cl.
| | |
|---|---|
| *C25C 3/02* | (2006.01) |
| *C25C 3/04* | (2006.01) |
| *C10G 21/28* | (2006.01) |
| *C10G 25/00* | (2006.01) |
| *C10G 25/12* | (2006.01) |
| *C10G 21/06* | (2006.01) |
| *C10G 21/08* | (2006.01) |

(52) U.S. Cl.
CPC ............ *C10G 25/003* (2013.01); *C10G 25/12* (2013.01); *C10G 29/04* (2013.01); *C25C 3/02* (2013.01); *C25C 3/04* (2013.01); *B01D 2256/24* (2013.01); *B01D 2257/30* (2013.01); *C10G 2300/202* (2013.01); *C10G 2300/207* (2013.01)

(56) References Cited

U.S. PATENT DOCUMENTS

| | | |
|---|---|---|
| 3,565,792 A | 2/1971 | Haskett |
| 3,663,433 A * | 5/1972 | Fraini et al. ............ C10G 45/04 |
| | | 208/213 |
| 3,787,315 A | 1/1974 | Bearden, Jr. et al. |
| 5,089,094 A | 2/1992 | Ogasawara et al. |
| 5,198,078 A * | 3/1993 | Gale ...................... C25C 3/04 |
| | | 204/245 |
| 2005/0161340 A1* | 7/2005 | Gordon ................. C10G 25/12 |
| | | 205/618 |
| 2009/0134040 A1 | 5/2009 | Gordon et al. |
| 2009/0134059 A1 | 5/2009 | Myers et al. |
| 2011/0100874 A1 | 5/2011 | Gordon |

OTHER PUBLICATIONS (University of York) Hydrogen chloride. [Retrieved form the internet Jul. 25, 2016] <URL: http://www.essentialchemicalindustry.org/chemicals/hydrogen-chloride.html> Mar. 18, 2013; p. 2, paragraphs 2-3.

International Search Report and Written Opinion, dated Aug. 22, 2016. PCT/US16/33919.

* cited by examiner

PROCESSING ALKALI METAL-SULFIDE OR ALKALI EARTH METAL-SULFIDE TO OBTAIN THE ALKALI METAL OR ALKALI EARTH METAL

PRIORITY CLAIM

This application claims the benefit of the filing dates of U.S. Provisional Patent Application Ser. No. 62/166,086, filed May 25, 2015, for PROCESSING ALKALI METAL-SULFIDE OR ALKALI EARTH METAL-SULFIDE TO OBTAIN THE ALKALI METAL OR ALKALI EARTH METAL; U.S. Provisional Patent Application Ser. No. 62/174,106, filed Jun. 11, 2015, for PROCESSING ALKALI METAL-SULFIDE OR ALKALI EARTH METAL-SULFIDE TO OBTAIN THE ALKALI METAL OR ALKALI EARTH METAL; and U.S. Provisional Patent Application Ser. No. 62/198,910, filed Jul. 30, 2015, for PROCESSING ALKALI METAL-SULFIDE OR ALKALI EARTH METAL-SULFIDE TO OBTAIN THE ALKALI METAL OR ALKALI EARTH METAL, the entire contents of all of which are incorporated by this reference as though set forth herein in their entirety.

TECHNICAL FIELD

This invention relates to processes using a chemical stripping agent for cleaning a fluid to remove undesired elements or compounds from the fluid, and subsequent treatment of a resulting product to recover the chemical stripping agent. One particular application relates to a process using an Alkali metal or Alkaline earth metal for removal of Sulphur from heavy crude oil.

BACKGROUND

Certain process fluids contain undesired elements or compounds. Sometimes, the presence of the undesirable element or compound may preclude beneficial use of a process fluid. For example, certain heavy crude oils contain Sulfur in some form or other. Presence of the Sulfur impedes refining the oil to create an acceptable fuel for e.g., transportation applications. For example, high-Sulfur diesel presents a hazard to the environment if consumed in large quantities for freight transportation. It would be an improvement to provide a cost-effective method for removing an undesired element or compound from a variety of process fluids, resulting in a clean fluid product.

DISCLOSURE OF THE INVENTION

The invention may be embodied to provide various apparatus and methods for removing one or more undesired element or compound from a wide-ranging variety of different process fluids. One method includes applying a sufficient quantity of an Alkali metal or an Alkaline earth metal to a process fluid to chemically bind the Alkali metal or Alkaline earth metal with an undesired element carried in the process fluid effective to form a first intermediary compound and thereby, to strip the undesired element from the process fluid resulting in a clean fluid product. Then, the first intermediary compound is extracted from the reaction vessel and processed in a first process loop to recover the Alkali metal or Alkaline earth metal. The recovered Alkali metal or Alkaline earth metal is then re-introduced to an additional quantity of process fluid to strip and clean the undesired element from the additional quantity of the process fluid. Sometimes, the recovery step includes a chemical substitution process effective to separate the Alkali metal or Alkaline earth metal from the undesired element. Other times, the recovery step may include an electrolytic process effective to separate the Alkali metal or Alkaline earth metal from the undesired element.

A method may include providing a reaction vessel and introducing a first quantity of a process fluid into the reaction vessel. A sufficient quantity of an Alkali metal or an Alkaline earth metal is then applied to the process fluid in the reaction vessel to chemically bind the Alkali metal or Alkaline earth metal with an undesired element carried in the process fluid effective to form a first intermediary compound and thereby, to strip the undesired element from the process fluid resulting in a clean fluid product. The first intermediary compound is then extracted from the reaction vessel and processed in a first process loop to recover the Alkali metal or Alkaline earth metal. Then, the recovered Alkali metal or Alkaline earth metal may be re-introduced into the reaction vessel to strip and clean an additional quantity of the process fluid.

Sometimes, the first process loop includes an electrolytic cell operable to separate the Alkali metal or Alkaline earth metal from the first intermediary compound. Sometimes, the first process loop includes an electrolytic cell operable to separate the Alkali metal or Alkaline earth metal from a different chemical compound. The first process loop may include an electrolytic cell operable to separate the Alkali metal or Alkaline earth metal from a chemical compound that may, or may not, include the undesired element. A byproduct from the electrolytic cell may be extracted and introduced into a quantity of intermediary compound in a second process loop to facilitate recovery and reuse of the Alkali metal or Alkaline earth metal. One or more halogenated compound may be added into an electrolytic cell to facilitate recovery and reuse of the Alkali metal or Alkaline earth metal.

Sometimes, separation of the first Alkali metal or the first Alkaline earth metal from an intermediary compound, or other compound, is by way of electrolysis. Separation of the first Alkali metal or the first Alkaline earth metal from an intermediary compound may be accomplished by way of a chemical replacement reaction. The intermediary compound may, or may not, include the undesired element or compound.

An operable method may include introducing a different Alkali metal or a different Alkaline earth metal into a first conversion vessel to separate a first Alkali metal or a first Alkaline earth metal from an intermediary compound. A workable different Alkali metal or Alkaline earth metal is effective to perform the chemical replacement operation. Subsequently, the first Alkali metal or first Alkaline earth metal may be extracted from the first conversion vessel and re-introduced into a reaction vessel in a first process loop to strip and clean an additional quantity of the process fluid. A method may include extracting a second intermediary compound, including the undesired element, from the first conversion vessel. The second intermediary compound may then be electrolyzed in an electrolytic cell to recover the different Alkali metal or different Alkaline earth metal. Then the recovered different Alkali metal or different Alkaline earth metal may be re-introduced into the first conversion vessel in a second process loop.

Sometimes, a method may include extracting a second intermediary compound, including the undesired element, from the first conversion vessel. The second intermediary compound may be processed in a second conversion vessel to recover the different Alkali metal or different Alkaline earth metal. The recovered different Alkali metal or different Alkaline earth metal may then be re-introduced into the first conversion vessel in a second process loop. Prior to a re-introducing step, the second intermediary compound may be processed with a scrubbing agent in a second conversion vessel to remove the undesired element from the first intermediary compound and form a third intermediary compound including the scrubbing agent and the different Alkali metal or different Alkaline earth metal. The third intermediary element may then be extracted from the second conversion vessel and processed in an electrolytic cell to recover the different Alkali metal or different Alkaline earth metal.

A second conversion vessel may be an electrolytic cell or define a volume in which a chemical exchange reaction may occur. It is within contemplation that an electrolytic cell may include a porous membrane disposed between a cathode and an anode effective to resist back-reacting products from respective electrodes with each other. A workable porous separator may be made from metal or ceramic.

One first process loop includes a first conversion vessel. A scrubbing agent may be obtained and applied to a first intermediary compound such that the scrubbing agent produces a modified form of the first intermediary compound. The modified form of the first intermediary compound may then be processed in an electrolytic cell to cause electrolytic separation of the scrubbing agent from the modified form of the first intermediary compound. Then the recovered scrubbing agent may be re-introduced into the first conversion vessel in a second process loop.

BRIEF DESCRIPTION OF THE DRAWINGS

In the drawings, which illustrate what are currently regarded as the best modes for carrying out the invention and in which like reference numerals refer to like parts in different views or embodiments.

MODES FOR CARRYING OUT THE INVENTION

An embodiment according to certain principles of the invention may be incorporated into, or as a portion of, a process for reducing/extracting undesired Sulfur contained in Sulfur bearing compounds from a stream or quantity of a process fluid, and further including a step of electrolytically separating an Alkali metal or Alkaline earth metal in elemental form from an intermediary process compound including the Alkali metal or Alkaline earth metal and Sulfur. The electrolytically recovered Alkali metal or Alkaline earth metal may then be reused to reduce/extract Sulfur from additional process fluid, or for some other purpose. Certain byproducts of the electrolytic process (such as elemental Sulfur) may be commercially exploited (e.g. sold or even sometimes applied to the process).

Alkali metals within contemplation for use in certain embodiments of the invention nonexclusively include Sodium, Potassium, and Lithium. The process will optionally also work on other Alkali metals, but these optional elements are generally of lesser importance. Similarly, Alkaline earth metals that may nonexclusively be employed in certain embodiments of the invention include Calcium and Magnesium. It may be advantageous to use alkaline earth metals as they are divalent, therefore remove twice as much sulfur per unit used. Again, the process will optionally also work with other Alkaline earth metals, but these optional elements are also currently perceived as being of lesser commercial importance. For example, certain optional elements may have reactivity that is insufficient to be commercially important in application to cleaning a process fluid. Further, certain of the optional elements may simply be too expensive to employ in a commercially feasible operation.

Figure 1:
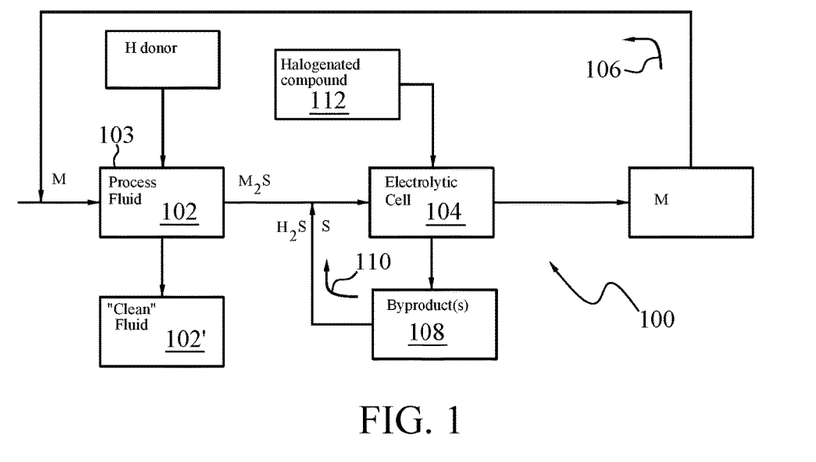
FIG. 1 illustrates a flow chart depicting a process within the ambit of certain principles of the instant invention.

An exemplary method according to certain principles of the invention, generally 100, is illustrated as a flow chart in FIG. 1. A sufficiently reactive Alkali metal (M) is applied to a process fluid 102 to bind with Sulfur (S) and form an intermediary process compound including the metal bound to Sulfur. The reactive Alkali metal is employed to strip Sulfur from the process fluid 102 and provide a "clean" process fluid 102'. An intermediary process compound may be Metal Sulfide ($M_2S$), formed as a precipitate. The Sulfur-stripping step of process 100 may be performed in a vessel 103 on a batch or flow-through basis. One process fluid 102 within contemplation includes heavy petroleum crude oil. Other process fluids 102 within contemplation nonexclusively include petroleum crude, bitumen, tar sands, refinery residue, vacuum gas oil, bunker fuel, and the like.

In one embodiment, elemental Sodium (Na) can be applied to a process fluid 102 to bind with Sulfur (S) and form an intermediary process compound including Sodium and Sulfur. In that case, an intermediary process compound may be Sodium Sulfide ($Na_2S$), formed as a precipitate. In another embodiment, elemental Lithium (Li) can be applied to a process fluid 102 to bind with Sulfur. In that case, an intermediary process compound may be Lithium Sulfide ($Li_2S$), formed as a precipitate. It should be realized that FIG. 1 can be modified to specifically illustrate other embodiments of the invention by simply replacing the Alkali metal symbol (M) with the symbol corresponding to any one of the aforementioned Alkali metals or Alkaline earth metals, or workable combinations there-of.

As indicated in FIG. 1, sometimes, a Hydrogen donor (H donor) may also be introduced into the reaction vessel 103 to facilitate the stripping process. Hydrogen provided by the donor fills the atomic spaces vacated by the stripped-off Sulfur atoms. Workable Hydrogen donors may nonexclusively include Magnesium Hydride ($MgH_2$), Hydrogen gas, Methane, Alkali Hydride, Hydrogen Sulfide, Ethane, water, Butane, metal hydrides, and/or Propane.

With continued reference to FIG. 1, in an operable embodiment of a method according to certain principles of the invention, Alkali metal Sulfide (from any source, including the aforementioned Sulfur-stripping operation) may be processed by electrolysis in an electrolytic cell 104 to obtain or recapture the Alkali metal in elemental metal form. An operable electrolytic cell 104 may be embodied as a two-compartment cell with a porous separator dividing the anode and cathode compartment. Alternatively, the electrolytic cell 104 may be similar in structure and/or configuration to a Downs cell. Recaptured elemental Alkali metal may then be applied to the process fluid 102 in a first process loop indicated by arrow 106 (FIG. 1), or otherwise commercially exploited. First process loop 106 includes a cleaning/stripping procedure performed on a process fluid 102 to remove one or more undesired element or compound, in this case, Sulfur.

Electrolysis of Alkali metal Sulfide in electrolytic cell 104 also presents an opportunity to capture one or more byproduct 108, which may separately be commercially exploited. Sometimes, a byproduct 108 (such as elemental Sulfur) may be sold. Other times, a byproduct 108 (e.g. Sulfur or Hydrogen Sulfide), may be applied to a stage or portion of a process in a second process loop indicated by arrow 110 (see FIG. 1). The byproduct can modify an intermediary chemical compound to facilitate subsequent processing.

Second process loop 110 in FIG. 1 includes a recovery operation that permits optional reuse of a product or byproduct. As also illustrated in FIG. 1, one or more halogenated compound 112 may be introduced to the electrolysis process melt or slurry, e.g., to reduce a temperature at which Alkali metal Sulfide undergoes a phase change from a solid precipitate to a fluid.

Figure 2:
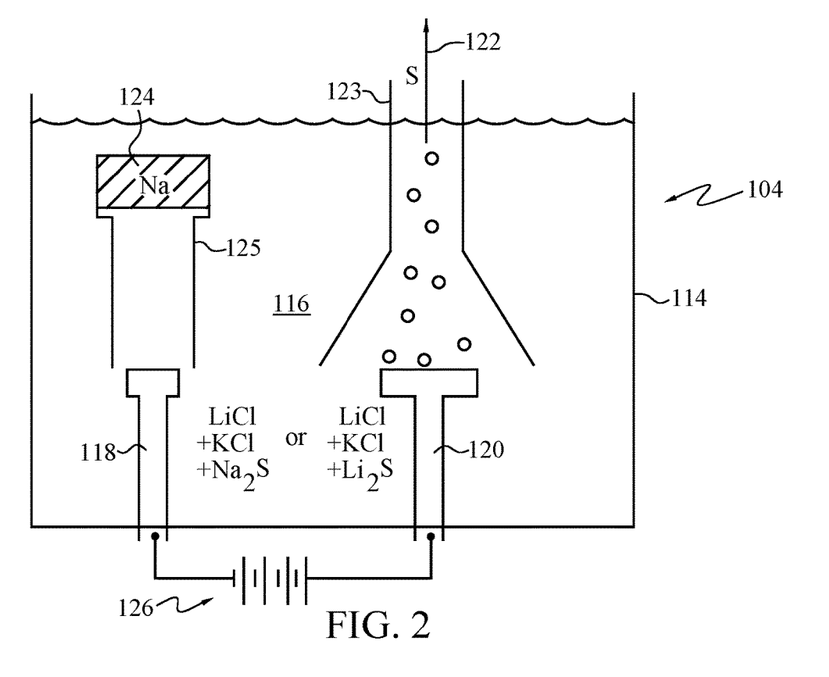
FIG. 2 is an illustration representing a first electrolytic process according to certain principles of the invention.

FIG. 2 illustrates a first operable electrolytic cell 104 and portion of an exemplary embodiment of a method 100 for an electrolysis process according to certain principles of the invention. For convenience, the electrolysis process will sometimes be described in this disclosure with particular reference to processing a melt of Sodium Sulfide. However, one of ordinary skill in the art will understand the electrolysis process will also apply to other Alkali metals used in the stripping/cleaning operation, such as Sodium, Lithium, and other elements previously mentioned.

Figure 2A:
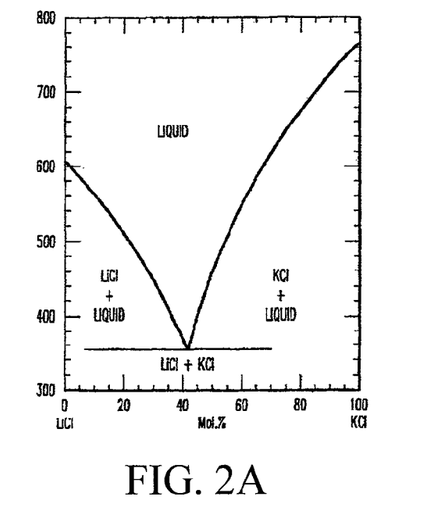
FIG. 2A is a phase diagram for Lithium Chloride and Potassium Chloride and applicable to the process indicated in FIG. 2.

Still with reference to FIG. 2, the illustrated cell 104 is similar to the well-known Downs cell used to electrolytically separate Sodium from molten Sodium Chloride. A heated vessel 114 holds the melt 116, which includes the intermediary process compound in molten state. FIG. 2A presents a phase diagram for Lithium Chloride and Potassium Chloride that is applicable to the process indicated in FIG. 2. Halogenated compounds 112, such as Lithium Chloride and Potassium Chloride, may be added to the melt 116 to reduce the temperature at which the phase change of Sodium Sulfide from a solid precipitate to a fluid state will occur. The preferred eutectic combination of Lithium Chloride and Potassium Chloride melts at about 350 degrees C. Molten Potassium Chloride/Lithium Chloride (KCl—LiCl) forms a paste when Sodium Sulfide ($Na_2S$) is added. The presence of molten ionic liquid of KCl—LiCl allows Sodium Sulfide to transfer Sodium quickly to the cathode 118 side while evolving Sulfur on the anode 120 side.

A workable cathode 118 for an electrolytic separation process according to certain principles of the invention, such as the process illustrated in FIG. 2, may be manufactured from Stainless Steel, Iron, Nickel, or Titanium. Also, a workable anode 120 may be manufactured from Carbon, Titanium, Titanium/Nickel alloy, Molybdenum, or an electrically conductive substrate that is coated with Titanium. A workable vessel 114 can be made from a material suitable for containing the various processed materials, compounds, and elements at the required temperature, such as Stainless steel, ceramics such as $Al_2O_3$ ceramics, glass, graphite, and the like. In certain processes, the vessel 114 is desirably heated to over about 450 degrees C., to ensure the Sulfur produced at the anode 120 is driven off as a fume 122 captured in exhaust collector 123 for convenient downstream processing. (Sulfur boils at about 444 degrees C.). Liquid Sodium 124 is generally less dense than the melt, and may be collected inside a cul-de-sac container 125, in similar fashion to that employed in the Downs cell.

Production rate of electrolytically-produced products depends, in part, on available current flow from the voltage source 126. In general, the voltage applied between the cathode 118 and anode 120 is typically in excess of the required minimum electrochemical decomposition voltage of the relevant compound (e.g., Sodium Sulfide requires ~2.2 V) plus overvoltage which is an amount required to compensate for losses attendant in the hardware and melt. However, too much excess voltage is typically not desired, so that electrolytically produced products do not include undesired elements present in the melt. For example, in the process in FIG. 2, the total applied voltage is desirably lower than the sum of that required to electrolyze the halogenated compounds (~4.0 V, or so), plus the overvoltage required to overcome attendant losses.

Figure 3:
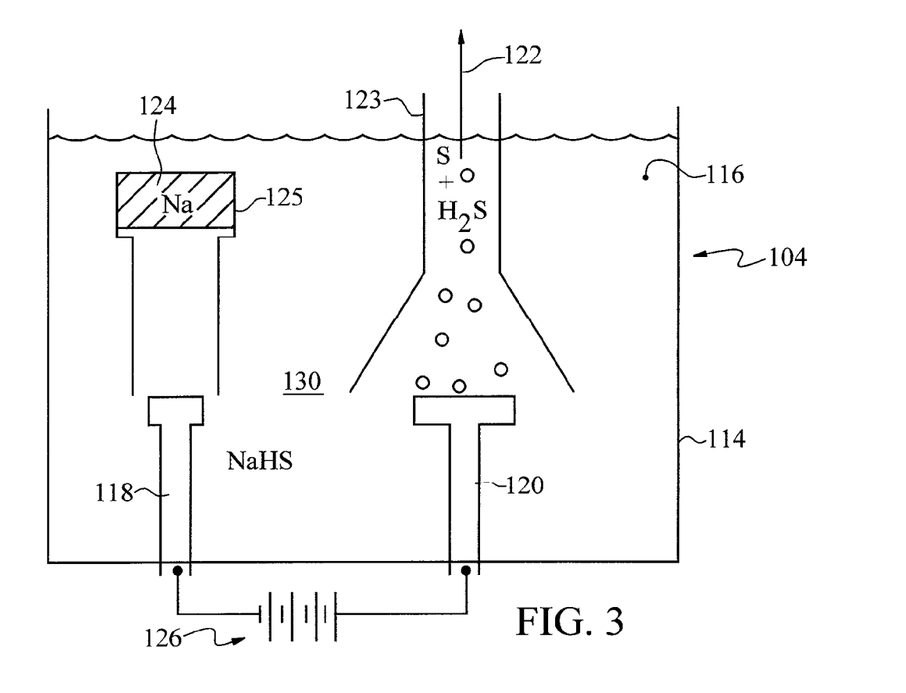
FIG. 3 is an illustration representing a second electrolytic process according to certain principles of the invention.

The electrolytic process indicated in FIG. 3 operates on a Sodium-Sulfur intermediary process compound 130 that is obtained from e.g., introducing Sodium metal into crude oil to produce Sodium Sulfide according to the formula: $Na+Oil \rightarrow Na_2S$. The Sulfur-compound precipitate extracted from the crude oil is then reacted with excess Sulfur (e.g., Hydrogen Sulfide) to form Sodium Hydro Sulfide according to the formula: $Na_2S+H_2S \rightarrow 2NaHS$. This processing step converts the melting point of $Na_2S$ (>800 degrees C.) to the more economically achievable melting point of NaHS (350 degrees C.). The melted product 2NaHS is subsequently electrolyzed to recapture the elemental Sodium metal as well as intermediary Hydrogen Sulfide gas and elemental Sulfur. The recaptured Hydrogen Sulfide may then be reintroduced into the processing step on the precipitate to prepare $Na_2S$ for electrolysis (e.g. 2nd loop 110, FIG. 1).

Figure 4:
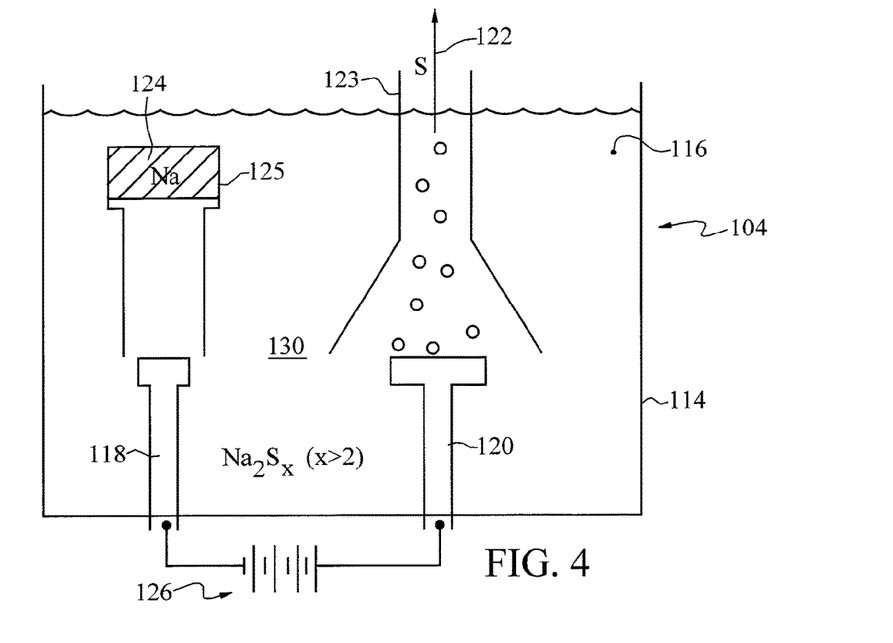
FIG. 4 is an illustration representing a third electrolytic process according to certain principles of the invention.

The electrolytic process indicated in FIG. 4 is somewhat similar to the process indicated in FIG. 3, but utilizes addition of elemental Sulfur to the precipitate according to the formula: $Na_2S+3S \rightarrow Na_2S_4$ and thereby reduces the precipitated intermediary process compound 130 to a more process-friendly compound. That is, the initial precipitate has a melting point of >800 degrees C., and the melting point of $Na_2S_4$ is about 250 degrees C., or so. The process-friendly compound may be of the form $Na_2S_x$ where x≥2. A workable anode 120 may be made from Carbon, and a workable cathode 118 may be made from Titanium. Again, the vessel 112 is typically heated to about 450 to 500 degrees C., or so, to boil off the Sulfur product at the anode 120 as a fume 122. The electrolytic Sulfur byproduct in gas form 122 is believed to be more appropriate for processing the (e.g. oil's) precipitate in a second loop (e.g., see 110 in FIG. 1). Of course, it is realized that in certain cases, a lower temperature may be appropriate to permit removal of elemental Sulfur from the electrolysis cell 104 as a precipitate, instead.

In general, an exemplary process according to certain embodiments of the instant invention utilizes a molten salt electrolysis procedure using Alkali metal- or Alkaline earth metal-Sulfide, or other Alkali metal- or Alkaline earth metal-Sulfur compound, as a feed material to produce elemental Alkali metal or Alkaline earth metal. One operable embodiment mixes Sodium Sulfide with a preferably eutectic blend of Alkali metal halides, and this mixture is heated to between about 300 and about 600 degrees C. The blend reduces the melting point of the Sodium-Sulfur compound to a more favorable, or process-friendly, lower temperature. Electrolysis of the melted mixture is typically carried out above 300 degrees C. to generate Sodium metal at the cathode 118 and Sulfur at the anode 120. The electrolysis temperature may be determined, in part, based upon the desired electrolysis products and byproduct(s).

In one embodiment, Sodium Sulfide is combined with a eutectic mixture of Lithium-halide and Potassium-halide. The combination is heated above the melting temperature of the eutectic combination, and electrolysis is carried out to generate Sodium metal at the cathode and Sulfur at the anode.

In another embodiment, Sodium Sulfide is combined with a eutectic mixture of Sodium-halide and Potassium-halide. The combination is heated above the melting temperature of the eutectic combination, and electrolysis is carried out to generate Sodium metal at the cathode and Sulfur at the anode.

In another embodiment, Sodium Hydro Sulfide is electrolyzed at temperatures over 350 degrees C. to generate Sodium metal at the cathode 118 and Hydrogen Sulfide at the anode 120. The Hydrogen Sulfide product is then used to convert Sodium Sulfide to Sodium Hydro Sulfide according to the equation: $Na_2S+H_2S \rightarrow 2NaHS$. Therefore, the feed can always be Sodium Sulfide, and the electrolysis products will include Sulfur and Hydrogen Sulfide. The Hydrogen Sulfide can be used in a secondary process loop 110 to convert Sodium Sulfide into Sodium Hydro Sulfide.

Figure 5:
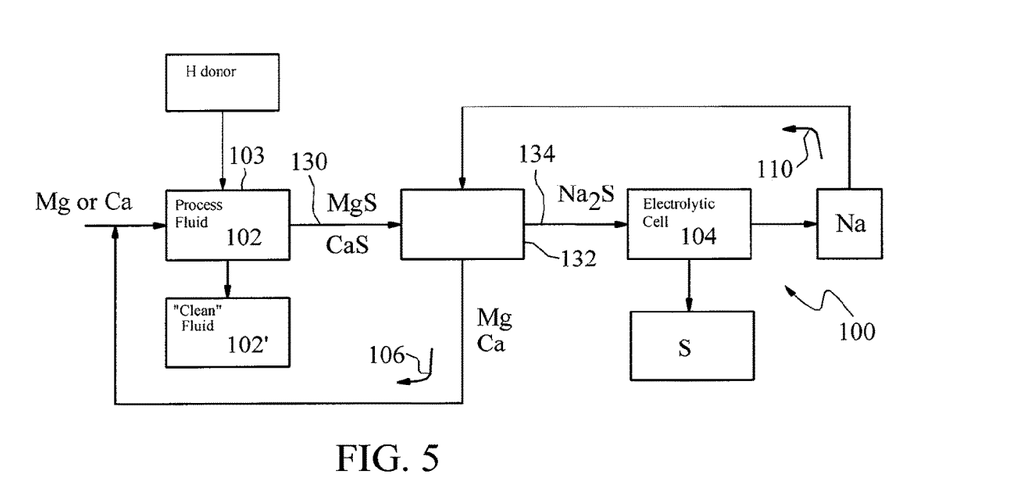
FIG. 5 is an illustration representing a fourth electrolytic process according to certain principles of the invention.

In another embodiment, an Alkaline earth metal (e.g., Magnesium or Calcium) can be substituted for the Alkali metal (e.g., Sodium) in the cleaning/stripping operation on the process fluid 102. An exemplary such embodiment is illustrated in FIG. 5. In this case, Magnesium Sulfide or Calcium Sulfide can be formed as a product precipitate or first intermediary process compound 130 during a stripping operation on a process fluid 102. Sodium may be applied to the product precipitate 130 in a conversion vessel 132 to remove the Sulfur, and thereby permit reuse of the Magnesium or Calcium in the cleaning/stripping process in a first process loop 106. First process loop 106 in FIG. 5 includes introducing an Alkaline earth metal (such as Magnesium or Calcium), to the fluid 102 in need of cleaning. Cleaning/stripping undesired elements and compounds from fluid 102 may be performed as the fluid 102 flows through a process container 103, or in batch mode. Cleaned fluid 102' is then extracted as a product of the cleaning/stripping operation.

The first intermediary compound 130 that is created by the cleaning/stripping operation (such as MgS or CaS), is then introduced to conversion vessel 132 for further processing to remove Sulfur from the Alkaline earth metal (e.g., Mg or Ca). Sodium Sulfide is a second intermediary compound 134, and is obtained from first conversion vessel 132. The second intermediary compound 134 may then be processed in an electrolytic cell 104 to recover the elemental Sodium for reuse in a second process loop 110.

Figure 6:
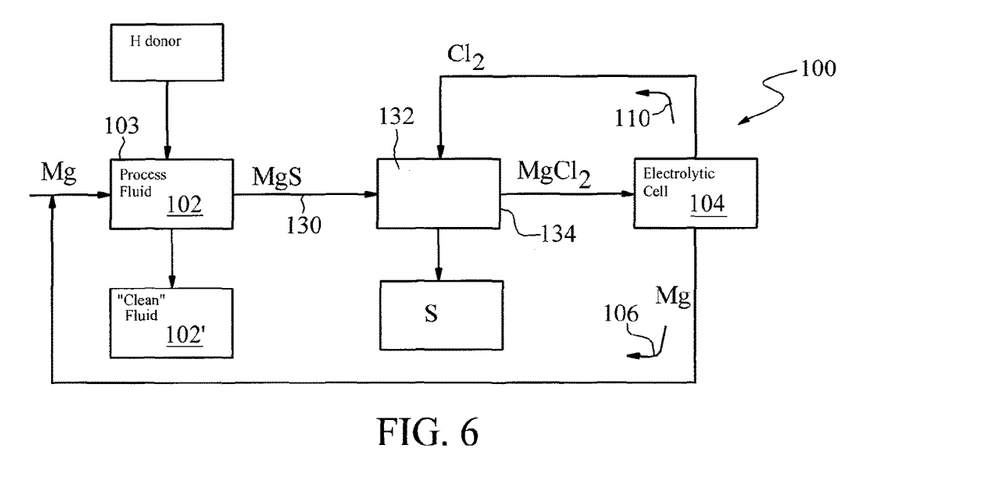
FIG. 6 is an illustration representing a fifth electrolytic process according to certain principles of the invention.

In the embodiment illustrated in FIG. 6, Magnesium is used in the stripping process loop 106 on fluid 102 to form a Magnesium Sulfide precipitate as a first intermediate process compound 130. The Magnesium Sulfide is then reacted with Chlorine in conversion vessel 132 to form Magnesium Chloride as a second intermediary compound 134. That product 134 is then electrolyzed using conventional procedures to recover elemental Magnesium that can be reused in a recovery/reuse loop 110 on the stripping process to clean fluid 102.

Figure 7:
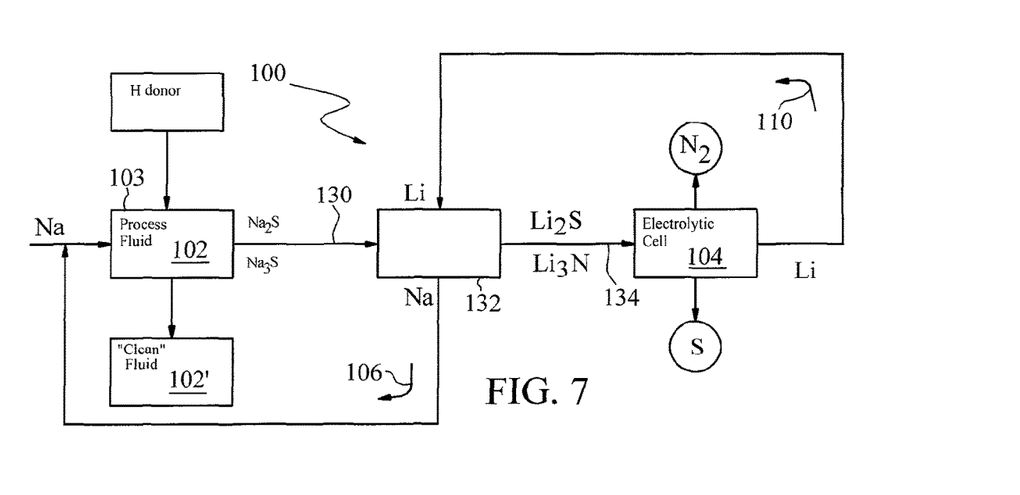
FIG. 7 is an illustration representing a sixth electrolytic process according to certain principles of the invention.

In the embodiment illustrated in FIG. 7, Sodium is used as a stripping agent to clean a process fluid 102, such as petroleum crude oil. First intermediate process compounds 130 or products may include Sodium Sulfide and/or Sodium Nitride. These compounds 130 are then reacted with Lithium metal to convert Sodium Sulfide and/or Sodium Nitride to Lithium Sulfide and/or Lithium Nitride in first conversion vessel 132 and yield elemental Sodium to return as a stripping agent for further use/reuse in loop 106 to clean the process fluid 102. The Lithium Sulfide and/or Lithium Nitride are second intermediary compounds 134 that then electrolyzed in an electrochemical cell 104 containing a preferably eutectic mixture of Lithium-Chloride/Potassium-Chloride molten salt electrolyte. Iron or Stainless Steel may serve as a workable cathode, and carbon forms an exemplary anode. The resultant Lithium metal is then used/reused in recovery/reuse loop 110 for the reduction of Sodium Sulfide and/or Sodium Nitride in first conversion vessel 132 to elemental Sodium.

Figure 8:
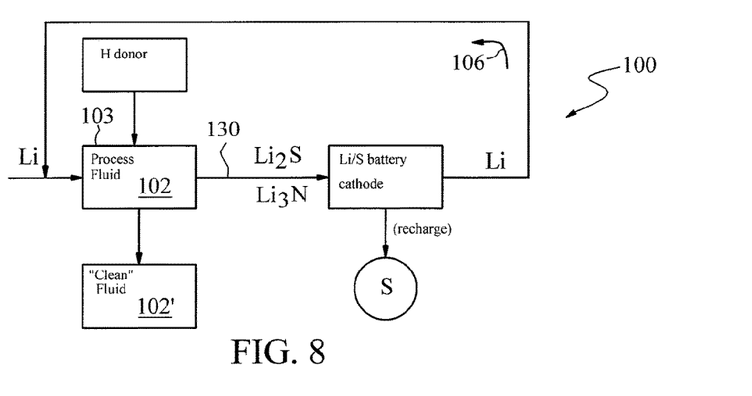
FIG. 8 is an illustration representing another electrolytic process according to certain principles of the invention.

As illustrated in FIG. 8, Lithium metal may be used in a process 100 to remove Sulfur and or Nitrogen from a process fluid 102, such as petroleum crude oil. The resulting Lithium Sulfide and/or Lithium Nitride product 130 can then be used as a cathode in a rechargeable Lithium/Sulfur battery using an organic electrolyte. Upon recharging the battery, resultant Lithium may be used/reused in a loop to process fluids and remove Sulfur and/or Nitrogen.

Figure 9:
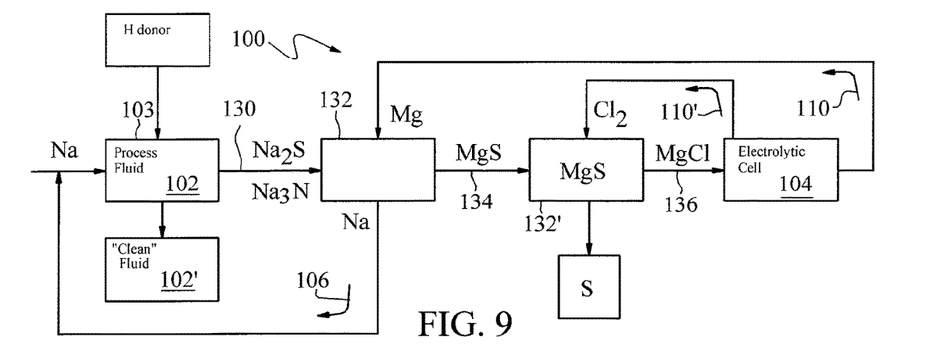
FIG. 9 is an illustration representing another electrolytic process according to certain principles of the invention.

The process 100 illustrated in FIG. 9 operates on a first intermediary compound 130, such as Sodium Sulfide ($Na_2S$), that may be obtained from, for example, introducing Sodium metal into crude oil to produce Sodium Sulfide in a reaction vessel 103 according to the reaction $Na+(Oil) \rightarrow Na_2S$. The precipitate extracted from the processed crude oil (such as Sodium Sulfide) is a first intermediate compound 130 and may be reacted with Magnesium metal in first conversion vessel 132 to form Magnesium Sulfide as a second intermediary compound 134 in accordance with the reaction: $Na_2S+Mg \rightarrow MgS+2Na$. The Sodium metal may then be recirculated in stripping/cleaning process loop 106 to process (react with and strip/remove Sulfur from) additional crude oil in process fluid 102. Magnesium may be obtained from an electrolytic cell 104, or some other source. Second intermediary compound Magnesium Sulfide 134 may be converted to a third intermediary compound Magnesium Chloride 136 in a second conversion vessel 132' by reacting with Chlorine gas. Chlorine gas may be obtained from an electrolytic cell 104, or some other source. Magnesium Chloride is subsequently converted to Magnesium and Chlorine by an electrolytic process in electrolytic cell 104. The Magnesium may then be recirculated to react with Sodium Sulfide in first recovery/reuse processing loop 110. Similarly, Chlorine may be recirculated in a second recovery/reuse process loop 110' to convert additional Magnesium Sulfide to Magnesium Chloride, and precipitate out Sulfur.

Figure 10:
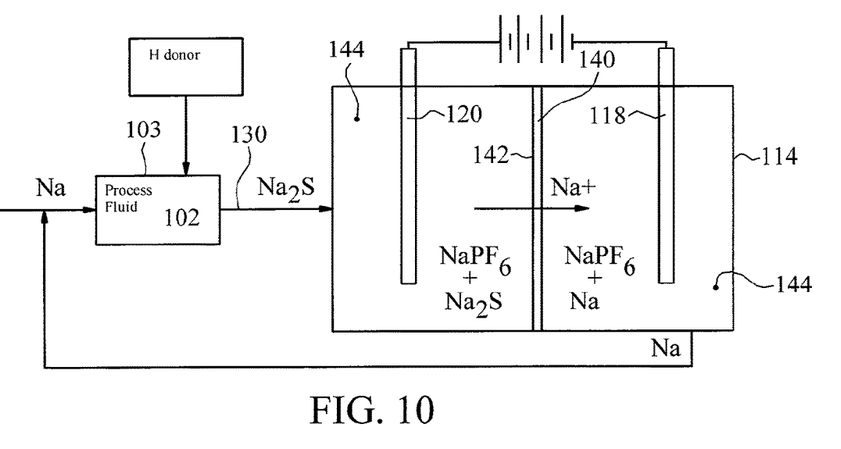
FIG. 10 is an illustration representing yet another electrolytic process according to certain principles of the invention.

FIG. 10 illustrates another process 100 that may be employed to remove an unwanted element, such as Sulfur, from a process fluid 102. Again, Sodium metal is combined with the dirty process fluid 102 to form a Sodium Sulfide ($Na_2S$) compound 130. That compound 130 can then be converted into elemental Sodium and Sulfur in the illustrated electrolytic process in a suitable container 114. The electrolytic cell 104 in FIG. 10 includes a porous separator 140, which may include one or more porous membrane 142, and liquid electrolyte 144 that is stable and inert with respect to Sodium metal and the Sodium Sulfide compound. The electrodes can include a Carbon anode 120 and Stainless Steel (or other Steel) cathode 118. An operable porous separator 140 can be made from a ceramic, ceramic/metal composite, ceramic/polymer composite, other polymer membrane, even metal, or metal screen. Suitable porous separators are commercially available.

Figure 11:
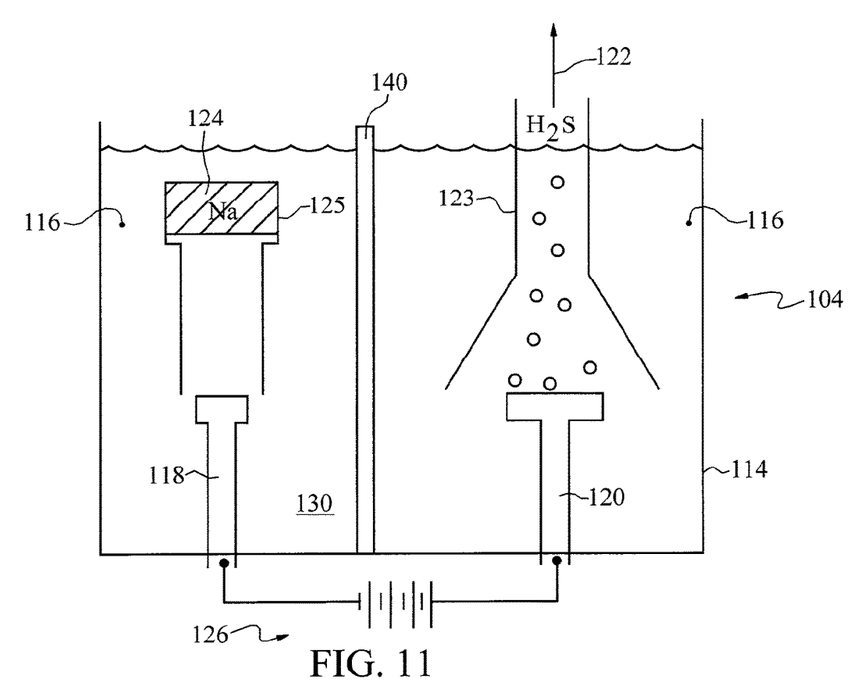
FIG. 11 is an illustration representing still another electrolytic process according to certain principles of the invention.

It should be appreciated that a porous separator 140 may be employed to advantage in any of the various electrolytic processes 100 or cells 104 described above, to further protect the electrolytic products formed at respective cathode and anode, and to resist back-reacting those products with each other. For example, a porous separator 140 can be added to the embodiment illustrated in FIG. 3, resulting in the embodiment illustrated in FIG. 11. The reaction products formed at respective anode and cathode are then effectively isolated from each other, and back-reaction is avoided. Such a separator 140 increases current efficiency, but also increases the cost of the cell. It is desirable to achieve a current efficiency of 80% to 90%.

Workable electrodes 118, 120 for use in certain embodiments of the instant invention include anodes 120 that are compatible with elements and compounds present in the melt or locally-produced electrolytic products and byproducts (such as Sulfur). Therefore operable anodes 120 may be composed of Carbon, Titanium, Niobium, Titanium-Nitride coated Titanium, etc. Similarly, workable cathodes 118 are desirably compatible with elements present in the melt and locally-produced electrolytic products, and may include cathodes 118 made from Iron, Stainless Steel, Nickel, and the like.

What is claimed is:

1. A method, comprising:
   providing a reaction vessel and a first conversion vessel;
   introducing a first quantity of a process fluid into the reaction vessel;
   chemically scrubbing the process fluid inside the reaction vessel with an Alkali metal to remove an undesired element comprising Sulfur or Nitrogen from the process fluid, the undesired element being carried away from the reaction vessel as a first intermediary compound comprising an Alkali metal sulfide or an Alkali metal nitride;
   introducing the first intermediary compound removed from the reaction vessel into the first conversion vessel;
   applying an Alkaline earth metal to the first intermediary compound in the first conversion vessel to chemically bind the Alkaline earth metal with the undesired element to form a second intermediary compound comprising an Alkaline earth metal sulfide or an Alkaline earth metal nitride and thereby, to strip the undesired element from the first intermediary compound and to permit recovery of the Alkali metal for recycled use in the reaction vessel;
   extracting the second intermediary compound from the first conversion vessel;
   processing the second intermediary compound in a process loop to recover the Alkaline earth metal; wherein the process loop comprises
   providing a second conversion vessel, and further comprising:
   introducing a Halogen into the second conversion vessel to separate the undesired element from the second intermediary compound and to form a third intermediary compound comprising an Alkaline earth metal halide;
   extracting the third intermediary compound from the second conversion vessel; and
   processing the third intermediary compound to recover the Alkaline earth metal for recycled use in the first conversion vessel and to recover the Halogen for recycled use in the second conversion vessel.

2. The method according to claim 1, wherein: the Halogen is chlorine gas.

3. The method according to claim 1, wherein the process fluid is converted into clean fluid subsequent to addition of the Alkali metal.

4. A method, comprising:
   providing a first conversion vessel;
   providing a process fluid;
   applying a sufficient quantity of an Alkali metal to the process fluid at a location disposed prior to the first conversion vessel to chemically bind the Alkali metal with an undesired element carried in the process fluid to strip the undesired element from the process fluid resulting in a clean fluid product and a first intermediary compound comprising the undesired element;
   introducing a first quantity of the first intermediary compound into the first conversion vessel;
   applying an Alkaline earth metal to the first intermediary compound in the first conversion vessel to chemically bind the Alkaline earth metal with the undesired element carried in the first intermediary compound effective to form a second intermediary compound and thereby, to strip the undesired element from the first intermediary compound;
   extracting the Alkali metal from the first conversion vessel;
   recycling the Alkali metal from the first conversion vessel for application of recovered Alkali metal to clean additional process fluid at the location;
   extracting the second intermediary compound from the first conversion vessel;
   processing the second intermediary compound in a process loop to recover at least the Alkaline earth metal; wherein the process loop comprises
   providing a second conversion vessel;
   introducing an effective Halogen into the second conversion vessel to react with the second intermediary compound in the second conversion vessel to separate the undesired element from the second intermediary compound and form a third intermediary compound comprising an Alkaline Earth Metal Halide;
   extracting the undesired element from the second conversion vessel;
   extracting the third intermediary compound from the second conversion vessel;
   processing the third intermediary compound in a third conversion vessel to recover at least the Alkaline earth metal; and
   introducing recovered Alkaline earth metal from the third conversion vessel into the first conversion vessel.

5. The method according to claim 4, wherein:
the Halogen is chlorine gas.

6. The method according to claim 4, wherein:
the third conversion vessel is an electrolytic cell.

7. The method according to claim 6, wherein:
the Halogen is recovered from the third conversion vessel for re-application in the second conversion vessel.

8. A method, comprising:

providing a reaction vessel and a first conversion vessel;

introducing a process fluid into the reaction vessel;

applying an Alkali metal to the process fluid in the reaction vessel to react with Sulfur in the process fluid and form an Alkali metal sulfide removing the Alkali metal sulfide from the reaction vessel and introducing the Alkali metal sulfide into the first conversion vessel;

applying an Alkaline earth metal to the Alkali metal sulfide in the first conversion vessel to form an Alkaline earth metal sulfide and to permit recovery of the Alkali metal for recycled use of the Alkali metal in the reaction vessel;

removing the Alkaline earth metal sulfide from the first conversion vessel and introducing the Alkaline earth metal sulfide into a second conversion vessel;

introducing a Halogen into the second conversion vessel to separate the Sulfur from the Alkaline earth metal sulfide and to form an Alkaline earth metal halide;

removing the Sulfur from the second conversion vessel;

removing the Alkaline earth metal halide from the second conversion vessel; and processing the Alkaline earth metal halide in an electrolytic cell to recover the Alkaline earth metal for recycled use in the first conversion vessel and to recover the Halogen for recycled use in the second conversion vessel.

* * * * *